G. R. FOWLER.
BASKET HANDLE AND LID FASTENER.
APPLICATION FILED NOV. 30, 1921.
1,424,009.
Patented July 25, 1922.
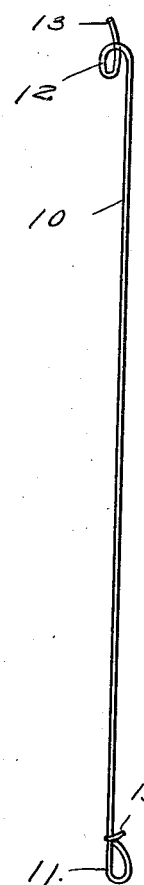
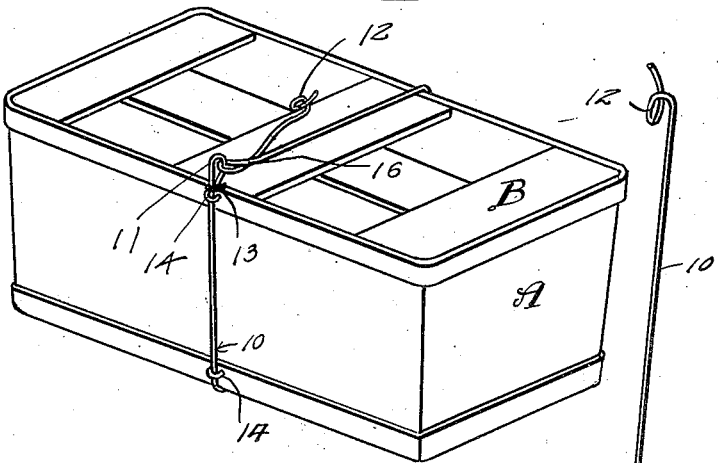
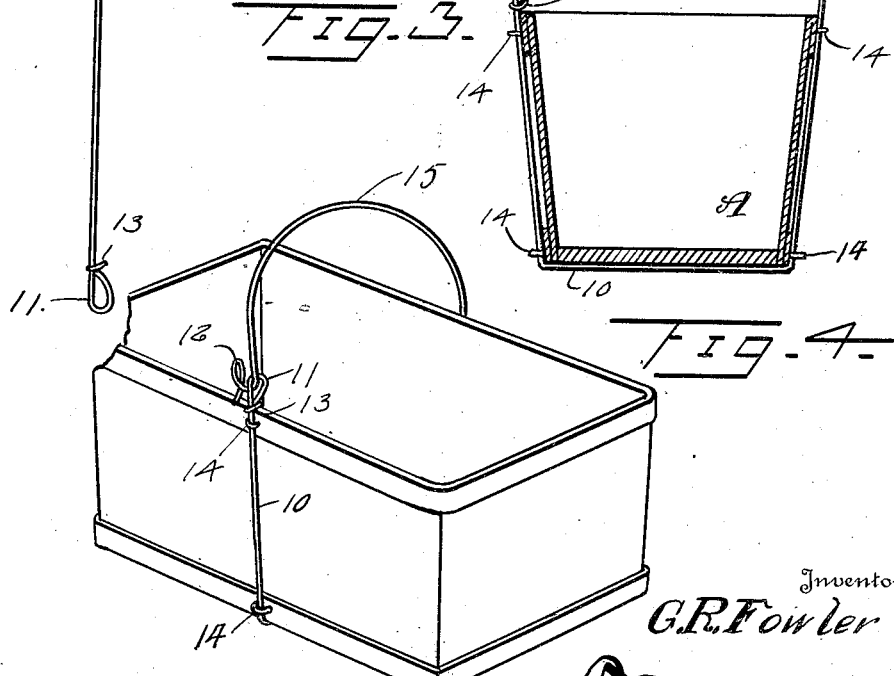
Inventor
G. R. Fowler
By
Attorney

UNITED STATES PATENT OFFICE.

GEORGE R. FOWLER, OF MARLBORO, NEW YORK.

BASKET HANDLE AND LID FASTENER.

1,424,009.  Specification of Letters Patent.  Patented July 25, 1922.

Application filed November 30, 1921. Serial No. 518,952.

*To all whom it may concern:*

Be it known that I, GEORGE R. FOWLER, a citizen of the United States, residing at Marlboro, in the county of Ulster and State of New York, have invented certain new and useful Improvements in a Basket Handle and Lid Fastener; and I do hereby declare the following to be a full, clear, and exact description of the invention, such as will enable others skilled in the art to which it appertains to make and use the same.

This invention relates to a basket or receptacle handle and lid fastener.

One important object is to provide a novel construction of combined lid fastening and handle, which while applicable to receptacles generally, is particularly adapted for use on the ordinary fruit and vegetable baskets for transportation of such farm produce to the consumer.

Another important object is to provide a combined handle and fastener of pliable wire or other material applicable to the basket at the factory, which thus overcomes the present method of differently counting, bunching, handling and securing the present type of wooden handles, freight charges, storage and the like dependent to the use of wooden handles and one which enables a stronger and reinforced basket to be shipped from the farm and which has a substantially applicable handle and fastener construction.

Another object is to provide a combined handle and fastener capable of manufacture in a wire strand and pliable to permit initial use on a basket while picking produce for transportation therein, and then be adjusted to a shorter position to serve as a handle and as a fastening means for the basket lid or closure.

Another important object is to provide the combined handle and fastener of such construction that it may be made from a single strand of wire or other pliable material and have hooks or loops adjacent opposite ends and preferably extending in opposite directions.

Additional objects and advantages will become apparent from a consideration of the description following taken in connection with accompanying drawings illustrating one practical embodiment.

In said drawings:—

Figure 1 is a perspective view of the combined handle and fastener.

Figure 2 is a perspective view illustrating a basket utilizing the improved handle and fastener in condition for transportation, Figure 3 is a cross sectional view through the basket illustrating the handle in position in which it is attached at the factory;

Figure 4 is a detail perspective view showing the use of the handle when the basket is used to receive a commodity as it is picked and which is to be carried by the picker.

Like reference characters designate like or similar parts in the different views.

In the different views of the drawings, where a basket is shown as at A, it is to be taken as of conventional shape and size and as made from any suitable material having the usual lid or closure B applicable thereto.

The combined handle and lid fastener constituting my invention consists of an elongated strand of pliable material, usually wire and as shown at 10. This strand at one end is formed into a hook or loop 11 while at its opposite end it is formed into a loop or hook 12. Said loops or hooks 11 and 12 preferably extend in opposite direction as shown in Figure 1. The free end of the hook as at 13 may overlap the strand itself to form a closed eye of the hook or loop, it being understood that such ends are readily bendable away from the strand their resiliency normally urging them into contact with the strand.

In use, at the factory, the basket A has the improved handle and lid fastener 10 secured thereto as shown in Figure 3. In other words, the hook 11 may be disposed adjacent and above the upper edge of the basket midway of the ends of one side thereof and said wire or strand 10 is passed across the bottom of the basket and up the other side, disposing the hook 12 at a considerable distance above the basket. Suitable staples or other fastening means at 14 may be used to attach the strand 10 in place on the basket.

When the basket is used as on the farm, for picking purposes, a portion of the strand 10 which projects above the basket in Figure 3 is bent over the basket into the form of a loop at 15 in Figure 4 and the hook 12 engaged in the hook 11. This forms a relatively high handle at 15 which is convenient to the picker in handling the basket and applying produce therein.

After the basket has been filled, the handle and lid fastener assumes the position shown in Figure 2. It will be seen in that figure that the closure B has been applied and that the hook 12 is passed through the hook 11 extending completely beyond the same, that the adjacent portion of said strand 10 as at 16 passes under the remainder of the strand and that the hook 12 is in direct contact with the cover or closure B and maintaining the same in place and urging it tightly into closed position.

It will be realized that an important feature resides in the fact that the handle may serve as a relatively elongated one as in Figure 4 for picking purposes and thereafter is capable of assuming a shape wherein the handle is of less size, which is desirable in packing and shipping, and where the hook 12 serves the second function of securing or fastening the lid in place.

It is to be understood that I have shown merely one practical embodiment of the invention in view of which fact, various changes may be made as in the kind of material from which the handle is made, the construction of the handle, and other alterations, changes in the detail, combination and arrangement, may be made, provided they fall within the spirit and scope.

I claim as my invention:—

1. A basket having a pliable handle, coacting fastening means adjacent the free ends of the handle, and one of said means being passable to the other means to engage the basket lid.

2. A basket having a pliable handle, fastening elements adjacent the free ends of the handle, and said elements being selectively attachable and one passable through the other to engage the basket lid.

3. A handle for a basket consisting of pliable material and having attaching means engageable to form a handle for the basket for picking purposes, and the handle being operable for shortening to facilitate shipping and to engage the basket lid as a fastening therefor.

4. A basket handle comprising an elongated pliable element, hooks formed adjacent the ends of the element, said hooks being engageable one with the other to form a handle, and said element being operable to form a fastening means for a basket closure.

5. A basket handle comprising an elongated pliable element, hooks formed adjacent the ends of the element, said hooks being engageable one with the other to form a handle, and one of said hooks being passable through the other hook to form a fastening means for the basket closure.

6. A basket handle comprising an elongated element, said element being operable to form a handle for the basket, and said element being adjustable to form a fastening means for the basket cover.

In testimony whereof I affix my signature in presence of two witnesses.

GEORGE R. FOWLER.

Witnesses:
 JAMES A. JOHNSTON,
 E. H. FAUST.